(12) United States Patent
Zeldis et al.

(10) Patent No.: US 8,429,692 B2
(45) Date of Patent: Apr. 23, 2013

(54) METHOD AND SYSTEM TO SEARCH VIEWABLE CONTENT

(75) Inventors: Andrew Zeldis, San Francisco, CA (US); Gina Terada, San Francisco, CA (US); David A. Merkoski, San Francisco, CA (US); Jared Marr, San Francisco, CA (US); Benjamin A. Rottler, San Francisco, CA (US); Jordan Kanarek, San Francisco, CA (US); Matthew Huntington, Twickenham (GB); Celine Pering, Palo Alto, CA (US); David Scott Nazarian, Seattle, WA (US); Joshua Wagner, San Francisco, CA (US)

(73) Assignee: OpenTV, Inc., San Francisco, CA (US)

( * ) Notice: Subject to any disclaimer, the term of this patent is extended or adjusted under 35 U.S.C. 154(b) by 481 days.

(21) Appl. No.: 12/377,653

(22) PCT Filed: Sep. 7, 2007

(86) PCT No.: PCT/US2007/019527
§ 371 (c)(1),
(2), (4) Date: Oct. 15, 2010

(87) PCT Pub. No.: WO2008/051331
PCT Pub. Date: May 2, 2008

(65) Prior Publication Data
US 2011/0023068 A1    Jan. 27, 2011

Related U.S. Application Data

(60) Provisional application No. 60/842,735, filed on Sep. 7, 2006, provisional application No. 60/911,009, filed on Apr. 10, 2007.

(51) Int. Cl.
*H04N 5/445* (2011.01)
*G06F 3/00* (2006.01)
*G06F 13/00* (2006.01)

(52) U.S. Cl.
USPC .......................................... 725/53

(58) Field of Classification Search ........................ None
See application file for complete search history.

(56) References Cited

U.S. PATENT DOCUMENTS

| 5,179,653 A | 1/1993 | Fuller |
| 5,623,613 A | 4/1997 | Rowe et al. |

(Continued)

FOREIGN PATENT DOCUMENTS

| AU | 2007292910 B2 | 2/2012 |
| AU | 2007309675 B2 | 3/2012 |

(Continued)

OTHER PUBLICATIONS

"VOD TV Guide deployed", [Online]. Retrieved from the Internet: <URL: http://web.archive.org/web/20040820160855/http://www.advancedtelevision.com/specialreport/VOD/tvguide.html>, (Dec. 2001-Jan. 2002), 1 pg.

(Continued)

*Primary Examiner* — Nasser Goodarzi
*Assistant Examiner* — Fred Peng
(74) *Attorney, Agent, or Firm* — Schwegman Lundberg & Woessner, P.A.

(57) ABSTRACT

A system to search to search viewable content in the context of television entertainment is provided. In one example embodiment, the system comprises a communications module to receive a request associated with one or more directional keys on a control device, a search term detector to determine a search term associated with the request, a search module to locate a content item associated with the search term; and a presentation module to present the content item associated with the search term.

13 Claims, 12 Drawing Sheets

U.S. PATENT DOCUMENTS

| | | | | |
|---|---|---|---|---|
| 5,790,115 A * | 8/1998 | Pleyer et al. | | 715/716 |
| 5,812,123 A | 9/1998 | Rowe et al. | | |
| 6,011,542 A * | 1/2000 | Durrani et al. | | 345/156 |
| 6,128,009 A | 10/2000 | Ohkura et al. | | |
| 6,147,714 A | 11/2000 | Terasawa et al. | | |
| 7,228,556 B2 * | 6/2007 | Beach et al. | | 725/53 |
| 7,539,472 B2 * | 5/2009 | Sloo | | 455/151.1 |
| 2002/0184183 A1 | 12/2002 | Cherry et al. | | |
| 2003/0070171 A1 | 4/2003 | Jeon | | |
| 2003/0197736 A1 | 10/2003 | Murphy | | |
| 2004/0249632 A1 | 12/2004 | Chacon | | |
| 2005/0204387 A1 * | 9/2005 | Knudson et al. | | 725/52 |
| 2006/0085819 A1 * | 4/2006 | Bruck et al. | | 725/52 |
| 2006/0149709 A1 | 7/2006 | Krakirian et al. | | |
| 2006/0161950 A1 | 7/2006 | Imai et al. | | |
| 2006/0236342 A1 | 10/2006 | Kunkel et al. | | |
| 2011/0023068 A1 | 1/2011 | Zeldis et al. | | |
| 2011/0090402 A1 | 4/2011 | Huntington et al. | | |

FOREIGN PATENT DOCUMENTS

| | | | |
|---|---|---|---|
| EP | 1653733 | A2 | 5/2006 |
| EP | 1672920 | A2 | 6/2006 |
| FR | 2830715 | A1 | 4/2003 |
| GB | 2376106 | | 12/2002 |
| JP | 201188644 | A | 10/2001 |
| JP | 2001283570 | A | 10/2001 |
| JP | 2002055752 | A | 2/2002 |
| JP | 2004096659 | A | 3/2004 |
| JP | 2004194095 | A | 7/2004 |
| JP | 2004527163 | A | 9/2004 |
| JP | 2005018756 | A | 1/2005 |
| JP | 2005101994 | A | 4/2005 |
| JP | 2002135676 | A | 5/2005 |
| JP | 2005514876 | A | 5/2005 |
| JP | 2006085222 | A | 3/2006 |
| JP | 2006104603 | A | 4/2006 |
| JP | 2006140603 | A | 6/2006 |
| JP | 2006238276 | A | 9/2006 |
| JP | 2007189741 | A | 7/2007 |
| WO | WO-02069629 | A2 | 9/2002 |
| WO | WO-02069629 | A2 | 9/2002 |
| WO | WO-2006105480 | A1 | 10/2006 |
| WO | WO-2008/030565 | A3 | 3/2008 |
| WO | WO-2008030565 | A2 | 3/2008 |
| WO | WO-2008051331 | A2 | 5/2008 |
| WO | WO-2008051331 | A3 | 5/2008 |

OTHER PUBLICATIONS

"Australian Application Serial No. 2007292910, First Examiner Report mailed Mar. 12, 2010", 2 Pgs.

"Australian Application Serial No. 2007309675, First Examiner Report mailed on Mar. 17, 2010", 2 pgs.

"Australian Application Serial No. 2007309675, Office Action Response filed Oct. 17, 2011", 18 pgs.

"Australian Application Serial No. 2007309675, Response to Examiner Report Aug. 1, 2011", 19 pgs.

"Australian Application Serial No. 2007309675, Subsequent Examiners Report mailed Aug. 18, 2011", 2 pgs.

"Australian Application Serial No. 2007292910, Office Action Mailed Aug. 3, 2011", 3 pgs.

"Australian Application Serial No. 2007292910, Office Action Response Filed Jul. 6, 2011", 9 pgs.

"Australian Application Serial No., Examiner's Report Response filed Sep. 29, 2011", 12 pgs.

"European Application Serial No. 07837881.7, Extended European Search Report Filed Sep. 1, 2011", 18 pgs.

"Japanese Application Serial No. 2009-527425, Office Action mailed Aug. 23, 2011", 6 pgs.

"Japanese Application Serial No. 2009-527428, Office Action mailed Aug. 23, 2011", 9 pgs.

"U.S. Appl. No. 12/377,650, Preliminary Amendment filed Feb. 16, 2009", 3 pgs.

"Australian Application Serial No. 2007309675, Examiner Report mailed Apr. 6, 2011", 2 pgs.

"Australian Application Serial No. 2007292910, Examiner Report mailed Apr. 4, 2011", 2 pgs.

"Australian Application Serial No. 2007292910, Office Action Response mailed Mar. 11, 2011", 20 pgs.

"Australian Application Serial No. 2007309675, Office Action Response Mar. 17, 2011", 22 pgs.

"European Application Serial No. 07811705.8, Extended European Search Report mailed Oct. 8, 2010", 7 pgs.

"European Application Serial No. 07811705.8, Response filed Apr. 27, 2011 to Extended European Search Report mailed Oct. 26, 2010", 13 pgs.

"European Application Serial No. 07837881.7, Extended European Search Report mailed Oct. 20, 2010", 7 pgs.

"International Application Serial No. PCT/US07/19527, International Search Report mailed Apr. 18, 2008", 10 pgs.

"International Application Serial No. PCT/US2007/019527, International Preliminary Report on Patentability mailed Mar. 19, 2009", 7 pgs.

"International Application Serial No. PCT/US2007/019554, International Preliminary Report on Patentability mailed Mar. 19, 2009", 8 pgs.

"International Application Serial No. PCT/US2007/019554, Search Report mailed on Jul. 24, 2008", 6 pgs.

"International Application Serial No. PCT/US2007/019554, Written Opinion mailed on Jul. 24, 2008", 3 pgs.

"Japanese Application Serial No. 2009-527425, Office Action mailed Mar. 21, 2012", With English Translation, 6 pgs.

"Japanese Application Serial No. 2009-527425, Response filed Nov. 18, 2011 to Office Action mailed Aug. 23, 2011", 11 pgs.

"Japanese Application Serial No. 2009-527428, Office Action mailed Mar. 21, 2012", With English Translation, 4 pgs.

"Japanese Application Serial No. 2009-527428, Response filed Jun. 11, 2012 to Office Action mailed Mar. 21, 2012", 6 pgs.

"Japanese Application Serial No. 2009-527428, Response filed Nov. 18, 2011 to Office Action mailed Aug. 23, 2011", 5 pgs.

"Japanese Application Serial No. 2009-527425, Response filed Jun. 6, 2012 to Office Action mailed Mar. 21, 2012", 6 pgs.

* cited by examiner

METHOD AND SYSTEM TO SEARCH VIEWABLE CONTENT

RELATED APPLICATIONS

This application is a U.S. National Stage Filing under 35 U.S.C. 371 from International Application Number PCT/US2007/019527, filed Sep. 7, 2007 and published in English as WO 2008/051331 on May 2, 2008, which claims the priority benefit of U.S. Provisional Application Ser. No. 60/842,735 filed on Sep. 7, 2006 and entitled "METHOD AND SYSTEM TO NAVIGATE MULTIMEDIA CONTENT" and of U.S. Patent Application Ser. No. 60/911,009 filed on Apr. 10, 2007 and entitled "METHOD AND SYSTEM TO SEARCH MULTIMEDIA CONTENT IN THE CONTEXT OF TELEVISION ENTERTAINMENT", which applications and publication are incorporated herein by reference in their entirety. This application is also related to commonly assigned PCT Application Number PCT/US2007/019554, filed Sep. 7, 2007, published in English as WO 2008/030565 on Mar. 13, 2008, and entitled "METHOD AND SYSTEM TO NAVIGATE VIEWABLE CONTENT". This application is also related to the U.S. National Stage Filing which claims priority to PCT Application Number PCT/US2007/019554, filed on even date herewith. These applications and publication are incorporated herein by reference in their entirety.

TECHNICAL FIELD

This application relates to a method and system to search viewable content in the context of television entertainment.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In the field of television entertainment, there is a new generation of viewers that has a high expectation of the level of entertainment to be enjoyed from television programming. These viewers may expect more choice, more flexibility, as well as the ability to interact and participate more with the viewable content.

On the other hand, the sheer volume of content that is available for viewing is exploding dramatically. Just the number of television channels that are now available is almost unmanageable. The amount of content that is available via free video or video on demand service is also increasing. It is now possible to view content over a wider span of time by employing time shifting technologies, such as Personal Video Recording (PVR) (sometimes referred to as DVR or Digital Video Recording). This explosion of content may be described as a paradox of choice, where the excess of choices causes a viewer's inability to choose.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
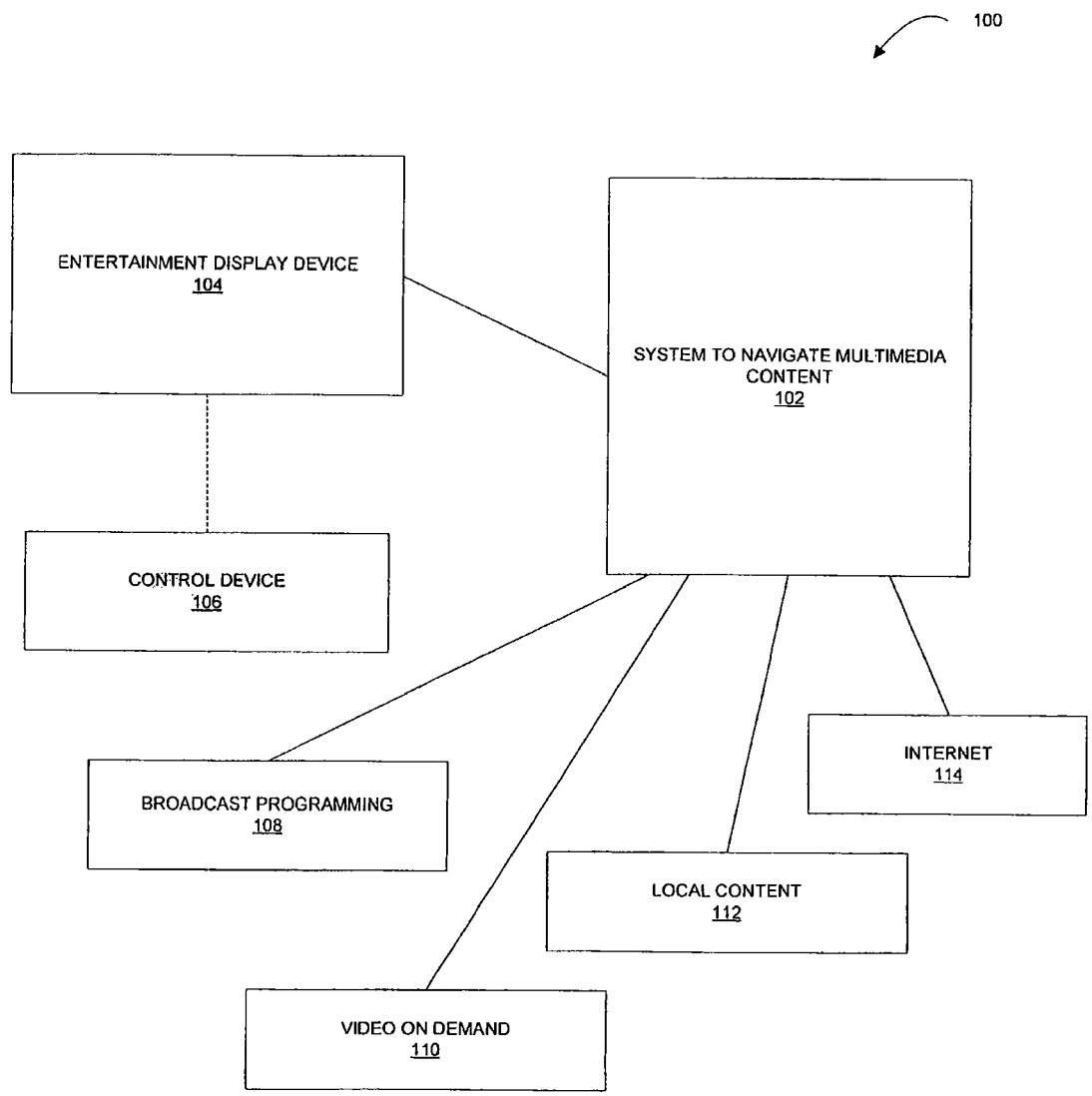
FIG. 1 illustrates an environment within which an example system to navigate viewable content may be implemented, in accordance with an example embodiment.

A method and system to search viewable content available for viewing (e.g., satellite content, cable content, mobile telephony content, IPTV content, and the like) and to manage a viewer's choice is described. In the following description, for purposes of explanation, numerous specific details are set forth in order to provide a thorough understanding of an embodiment of the present invention. It will be evident, however, to one skilled in the art that the present invention may be practiced without these specific details. It is to be noted that the delivery mechanism for the content for viewing may be via a satellite, cable, terrestrial broadcast, Internet, local storage, a local network, mobile telephony, or any other content distribution network. Accordingly, the viewing device need not be a television set but may be any display unit of any device (including portable devices). It will be noted that any references to television content will be understood to include any content available for viewing on an entertainment display device, such as a television screen. Such content may include television programming, as well as locally stored content, such as stored video files or digital images, as well as content accessible via the Internet. It will be noted that the term viewer may be understood broadly as any viewer of the system to navigate television content.

In one example embodiment, a viewer is permitted to enter or select a search term or an indication of a desired content item, e.g., via the directional keys on a remote control device used to navigate television programs. An example system to search viewable content uses a search term or a keyword designated by the viewer (e.g., via text entry, chosen from a list or keywords, etc.) to locate and select content that has been identified as potentially desired by the viewer, based on the submitted search term. For example, the system may search for a desirable content item by detecting the search term in the title of a particular content item. In some embodiments, the system may be configured to investigate metadata associated with a content item with respect to the search term and determine whether the content item should be presented to the viewer based on the results of the investigation.

The search results may be provided to the viewer in a variety of formats. For example, one or more content items that were determined to be most relevant with respect to the search term provided by the viewer, may be presented to the viewer in a manner that allows the displaying of a still picture or streaming video. In some embodiments, the search results may be presented in the form of a list of items, from which the viewer may make a selection. The search results may also be provided by grouping a plurality of links to resulting content items into several categories, based on different interpretations of a more precise meaning of the search term.

As described in more detail below, a search term may be determined from a search request that was submitted to the system by a viewer utilizing a text entry mode. A request may also be submitted by selecting a keyword extracted from metadata associated with a content item or selected from a list of keywords provided to the viewer as part of a particular navigation mode. For example, a list of keywords may be provided with a so-called media card associated with a particular content item. A media card, in one example embodiment, may provide additional information regarding the content item, including a list of keywords, stored as metadata associated with the content item. In some embodiments, a search term may be derived from a selection made by a viewer from a so-called margin menu.

A margin menu, in one example embodiment, is a menu that can be displayed in the margins of a viewing area (e.g., in the margins, or along the edges of video content, or at the periphery of a TV screen or any other viewing device). A system to search viewable content, in some example embodiments, may be implemented as part of a system to navigate viewable content that may include functionality beyond search capabilities. An example system to navigate viewable content in the context of television entertainment may be described with reference to FIG. 1.

FIG. 1 illustrates an environment 100 within which an example system to navigate viewable content may be implemented. The environment 100 includes a system to navigate viewable content 102 in communication with an entertainment display device 104 and a control device 106. In one example embodiment, the entertainment display device 104 is a television set, and the control device 106 is a remote control device that may be used for switching between television channels, for example. The system to navigate viewable content 102 is shown as having access to broadcast programs 108, video on demand programs 110, as well as to local content 112 and Internet content 114. An example system to navigate viewable content in the context of television entertainment may be described with reference to FIG. 2.

Figure 2:
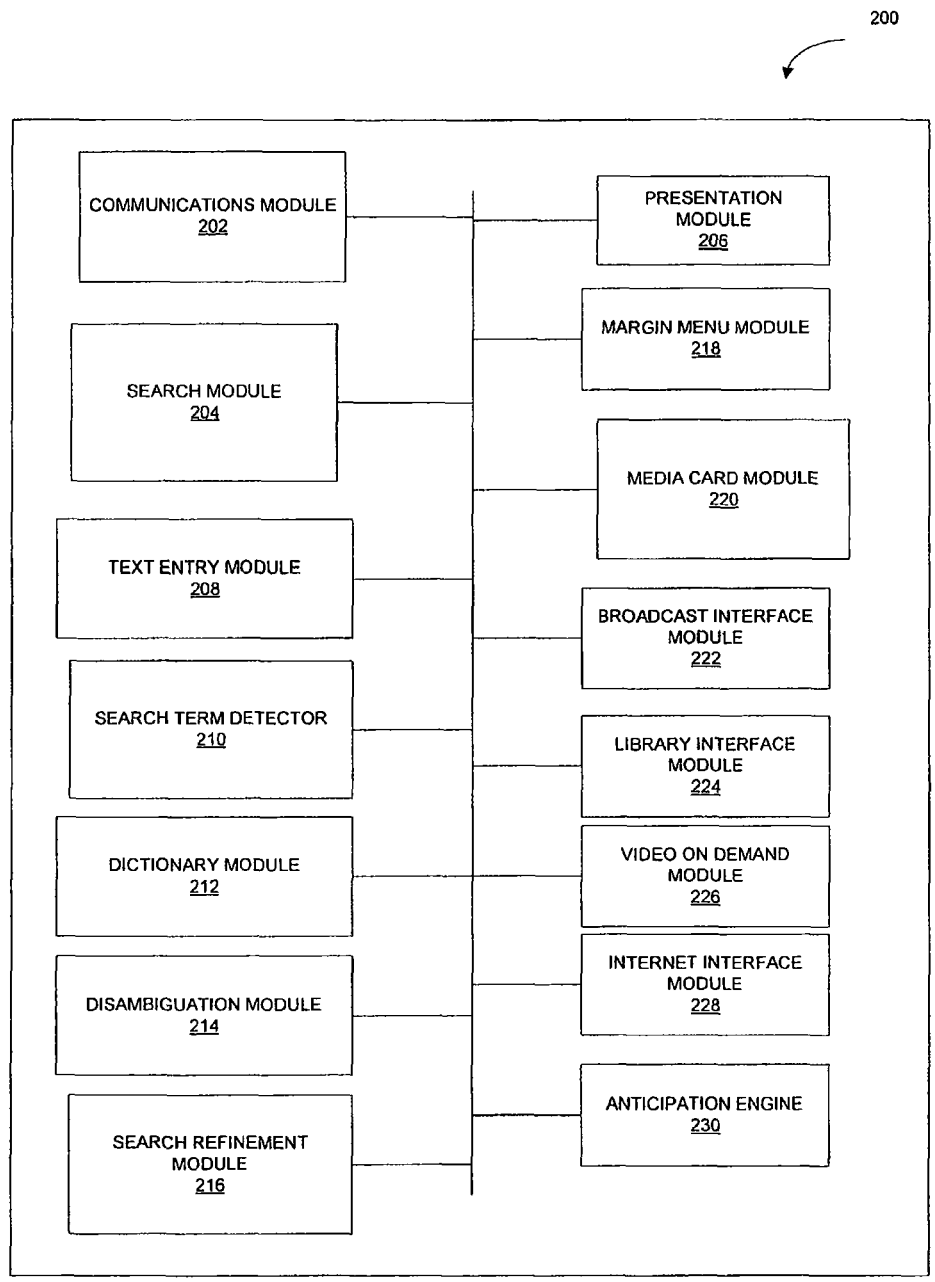
FIG. 2 is a block diagram illustrating a system, in accordance with an example embodiment, to navigate viewable content.

FIG. 2 illustrates an example system 200 to navigate viewable content. The system 200 includes a communications module 202, a search module 204, and a presentation module 206. The communications module 202 may be configured to receive requests from a viewer, e.g., content search, content selection, and content navigation requests. As mentioned above, the requests may be received from a television remote control device. The search module 204 may be configured to locate the requested content item based on a search term associated with the search request. The search module 204 may be configured to cooperate with a text entry module 208 and a search term detector 210. The text entry module 208, in one example embodiment, permits a viewer to enter search terms in a text format. The text entry module 208 may cooperate with a dictionary module 212 to generate suggested search terms and to present a reduced set of letter selections based on an incomplete text entry by the viewer. The search term detector 210 may be configured to determine a search term associated with a viewer's request. A disambiguation module 214 of the system 200 may be configured to generate a more precise search terms based on the search term provided with the viewer's request. The viewer may then be provided with an option to select one of the generated more precise search terms to be used by the system 200 to search for content. The example system 200 further includes a search refinement module 216 to permit filtering of the content items located by the search module 204.

The presentation module 206 may be configured to present viewers with search options, search results, as well as with various navigation options. For example, the presentation module 206 may cooperate with a margin menu module 218 to present different margin menus in response to viewer's requests associated with directional keys on a remote control device. The margin menu module 218, in one example embodiment, may include a plurality of modules, each of which being associated with its respective margin menu. Example margin menus are described further below. The presentation module 206 may also be configured to present to a viewer a media card associated with a particular content item, utilizing a media card module 220.

As mentioned above, the content available for viewing on an entertainment display device may include television programming, locally stored content, video on demand, as well as content accessible via a local network or the Internet. The system 200, in one example embodiment, includes a broadcast interface module 222 to access television programming, a library interface module 224 to access locally stored content, a video on demand module 226 to access video on demand, an Internet interface module 228 to access local network and Internet content, and an anticipation engine 212 to drive recommendations suggested to a viewer. Example recommendations mode is described further below. It will be noted that some or all of the modules of the system 200 may be considered to be a system to search viewable content. Example operations performed by the system 200 may be described with reference to FIG. 3.

Figure 3:
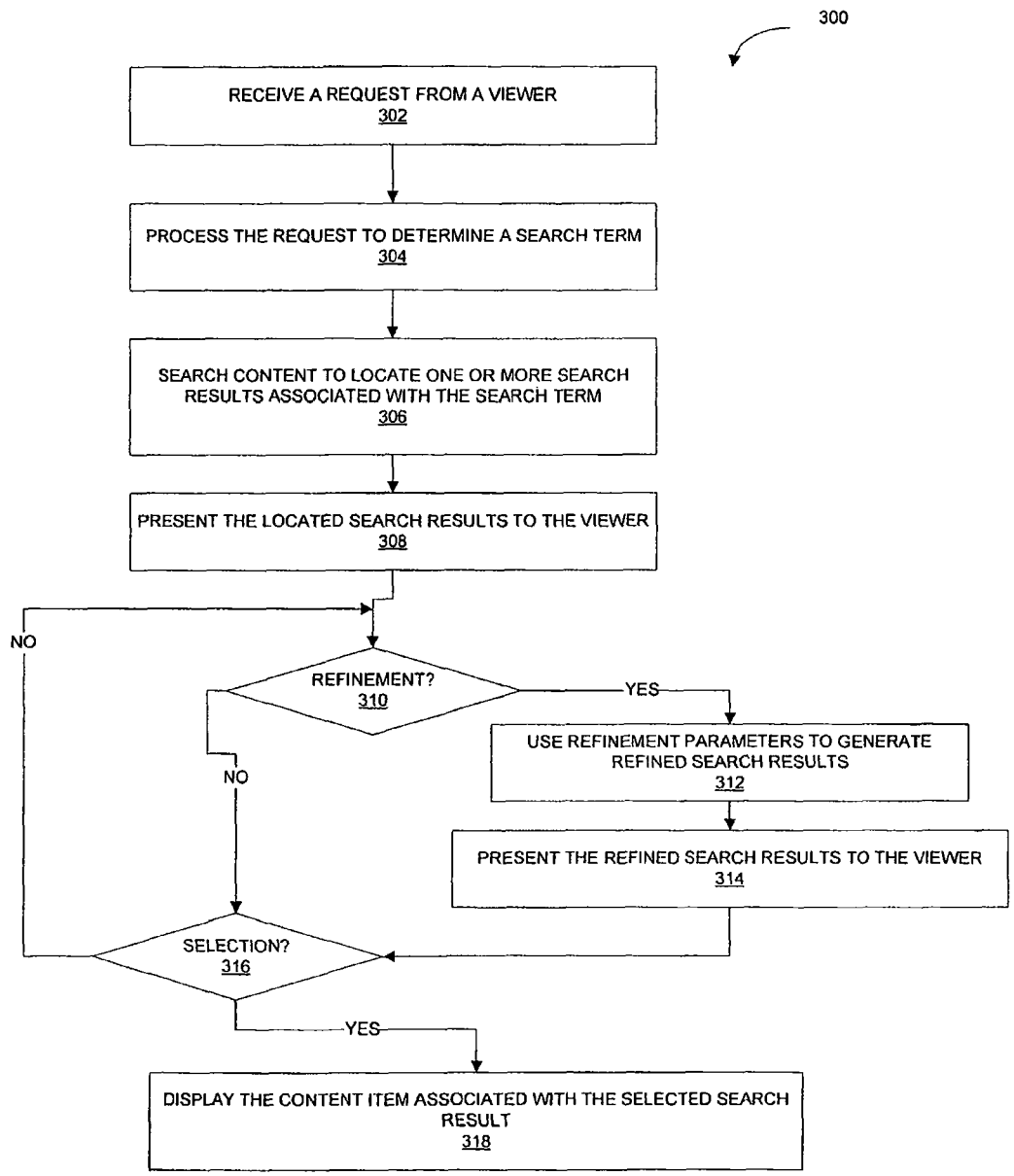
FIG. 3 is a flow chart illustrating a method, in accordance with an example embodiment, to search for content.

FIG. 3 illustrates an example method 300 to search for content. The method 300 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2.

As shown in FIG. 3, the method 300 commences with operation 302, where a search request is received by the communications module 202 of the system 200. A search request may be initiated by a viewer is a variety of ways. For example, as mentioned above, a viewer may enter a search term by activating a text entry mode. A search request may also be communicated to the system 200 by a viewer by selecting a keyword presented on a media card.

The concept of margin menus in general may be utilized advantageously with the system 200 to navigate viewable content to assist viewers to navigate to relevant and interesting content. In one example embodiment, an interface for navigating viewable content may include a feature that permits a viewer to continue viewing the current content while, at the same time, previewing different content (e.g., the content selected via a margin menu choice). It will be noted, however, that in some embodiments there may not be a margin per se. In such situation, the main content may be resized in order to create space for the margin menu. An example margin menu may be displayed such that it does not obscure the content that a viewer is currently watching, while permitting a viewer to start navigating towards different viewable content. A separate margin menu may be associated with each directional key on a viewer's remote control device. The margin menu may extend around the entire periphery of the viewing area or only a portion thereof. In one example embodiment, the directional keys that are provided with a remote control device may be utilized to navigate margin menus, with or without employing a specialized control key to permit content navigation and selection.

In one example embodiment, a margin menu associated with a particular directional key may be displayed in such a way that it reinforces a viewer's key-menu association. For example, a margin menu associated with an "Up" directional key may be displayed near the top edge of the viewing area, a "Down" directional key may be displayed near the bottom edge of the viewing area, a "Left" directional key may be displayed near the left edge of the viewing area, and a "Right" directional key may be displayed near the right edge of the viewing area. It will be noted, that a variety of remote control devices may be utilized with the system to navigate viewable content, including, e.g., controllers designed for games, that may have more than four directional keys. Using points of a compass, such controllers may have directional keys labels as "N," "NE," "E," "SE," "S," "SW," "W," and "NW," and these directional keys may also be used by the system to permit viewers to navigate through viewable content.

In order to exit from viewing a margin menu, a viewer may press the directional key opposite from the key that engaged the margin menu. For example, a viewer may bring up a left margin menu by pressing the left directional key and then exit from viewing the left margin menu by pressing the right directional key. According to one example embodiment, a viewer may also exit by pressing some other key as well, such as "Back", "Exit," or any other key. It will be appreciated that the specific interface used to navigate a margin menu may vary from one viewing device to another. For example, when viewing content on a computer system, directional keys of a keyboard may be used. When viewing content on a mobile device, numerical keys may be used, and so on.

Returning to FIG. 3, in response to receiving a search request, the search term detector 210 of FIG. 2 processes the request to determine a search term associated with the request, at operation 304. At operation 306, the search module 204 utilizes the search term to locate at least one relevant search result. The search results are presented to the viewer at operation 308. In some embodiments, the viewer may be permitted to further refine the search, e.g., buy selecting a more precise meaning of the initial search term. If such refinement of the search results is requested, which is determined at operation 310, the refined search results are generated at operation 312 and presented to the viewer at operation 314.

If it is determined, at operation 316, that a particular search result was selected by the viewer, the content item associated with the selected search result is displayed at operation 318. As mentioned above, an example system to search viewable content may be configured to permit a viewer to enter a search term or a keyword utilizing various features or navigation modes that may be provided with the system 200 to navigate viewable content. Example operations that may be performed while processing a search request may be discussed with reference to FIG. 4.

Figure 4:
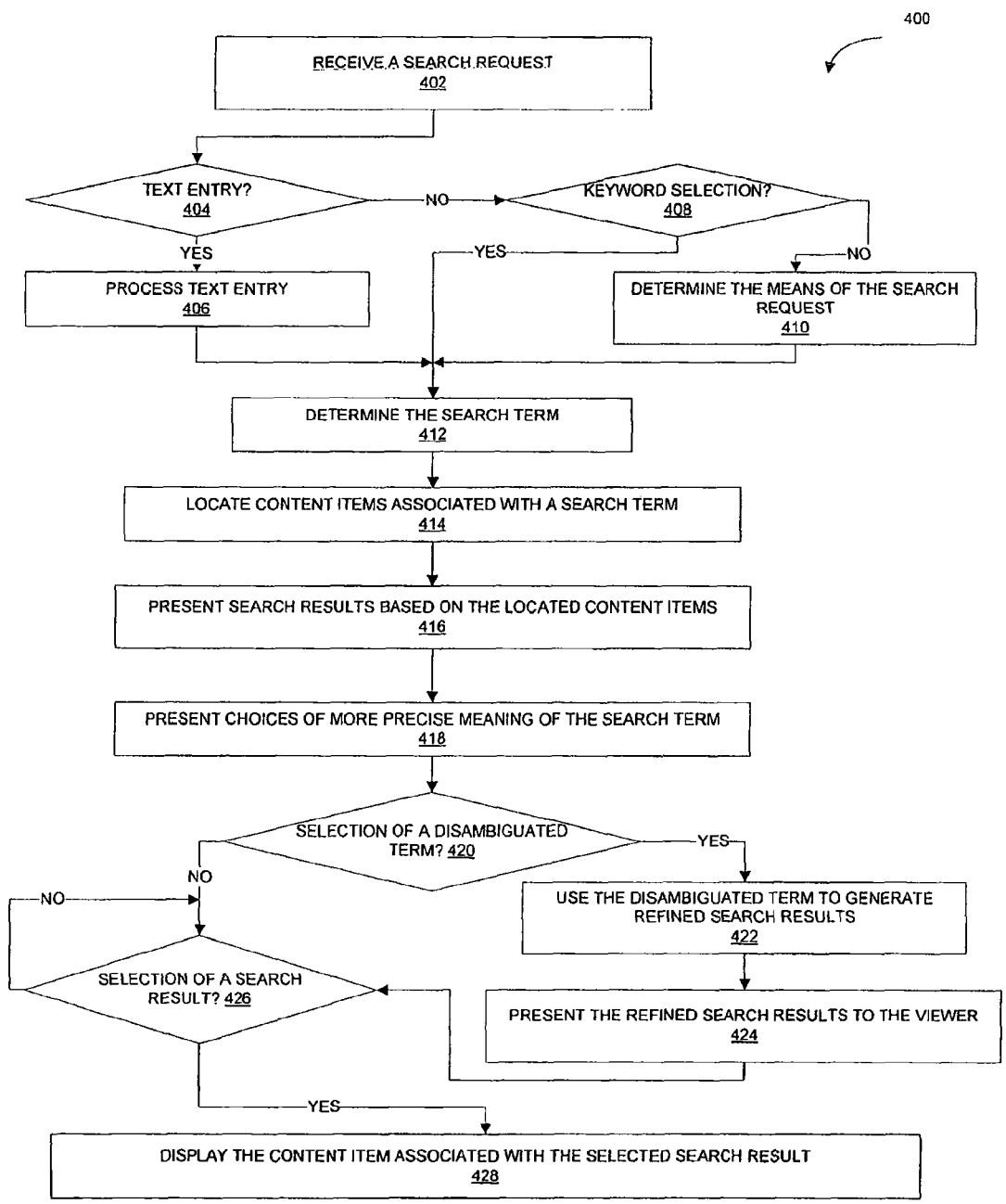
FIG. 4 is a flow chart illustrating a method that includes additional operations that may be performed in one example implementation of a method to search for content.

FIG. 4 illustrates a method 400 that includes additional operations that may be performed in one example implementation of a method to search for content. The example method 400 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2.

Figure 5:
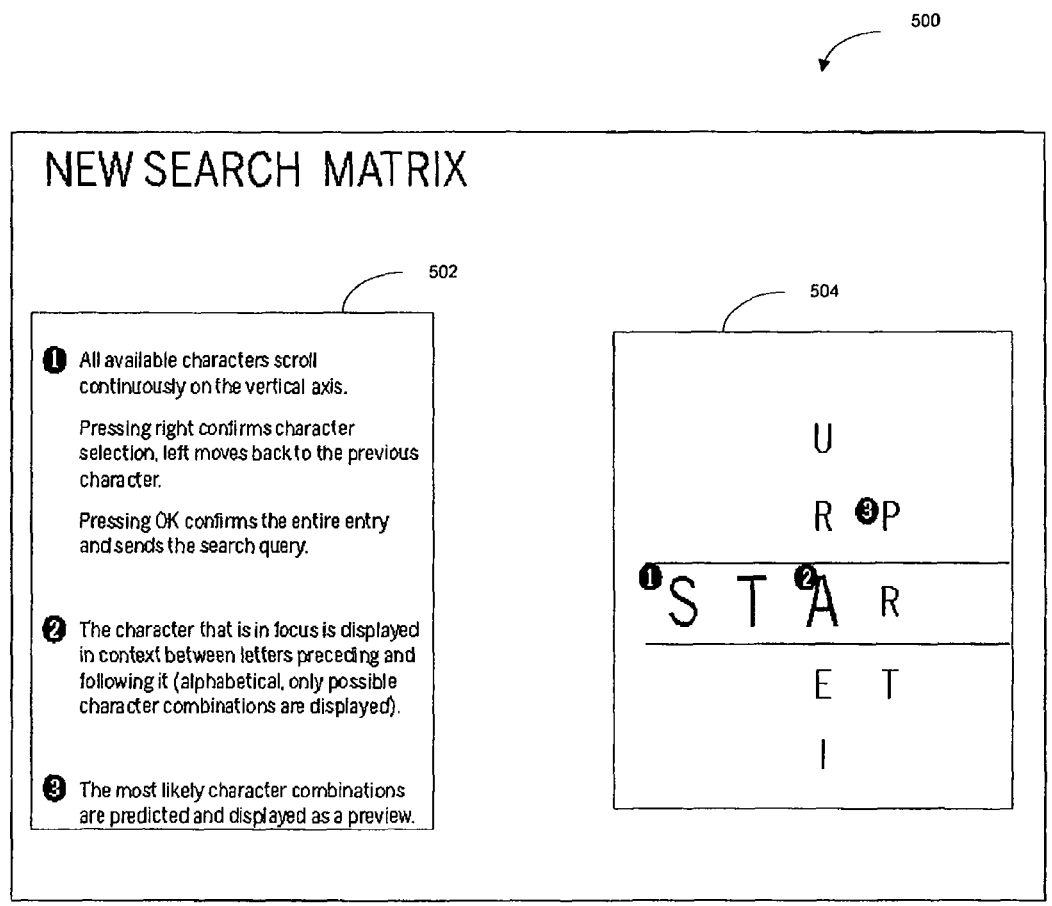
FIG. 5 illustrates a viewer interface to enter text utilizing a character wheel, in accordance with an example embodiment.

As shown in FIG. 4, the method 400 commences with operation 402, where a search request received by the communications module 202 of the system 200. In one example embodiment, the search mode that permits viewers to request a search may be activated by pressing a "Search" key on a remote control device. At operation 404, the search term detector 210 determines whether the search request is associated with a text entry mode (that may be provided with the system 200 to navigate content) and processes the entered text at operation 406. In one example embodiment, a viewer is presented with an interface that allows a viewer to enter search terms by making selections from a wheel of characters, utilizing the directional keys. In one example embodiment, the wheel of characters includes letters, as well as numbers and other characters. Once a letter is selected, e.g., by moving the wheel of letters using the "Up" and "Down" directional keys and then using the "Right" directional key to finalize the choice of the letter, the next wheel of letters is presented in response to the viewer activating the "Right" directional key, and so on. Each consecutive wheel of letters may have a reduced selection of letters, based on an algorithmic analysis of the preceding letter frequency and in conjunction with subsequential letter frequency in the terms stored in the dictionary. Completion of the search term may be indicated by the "Select" key. An example of this technique is illustrated in FIG. 5. A visualization 500 of this technique, entitled "New Search Matrix," describes steps 1, 2, and 3, in area 502. The resulting display on the viewer's screen is illustrated in area 504.

Figure 6:
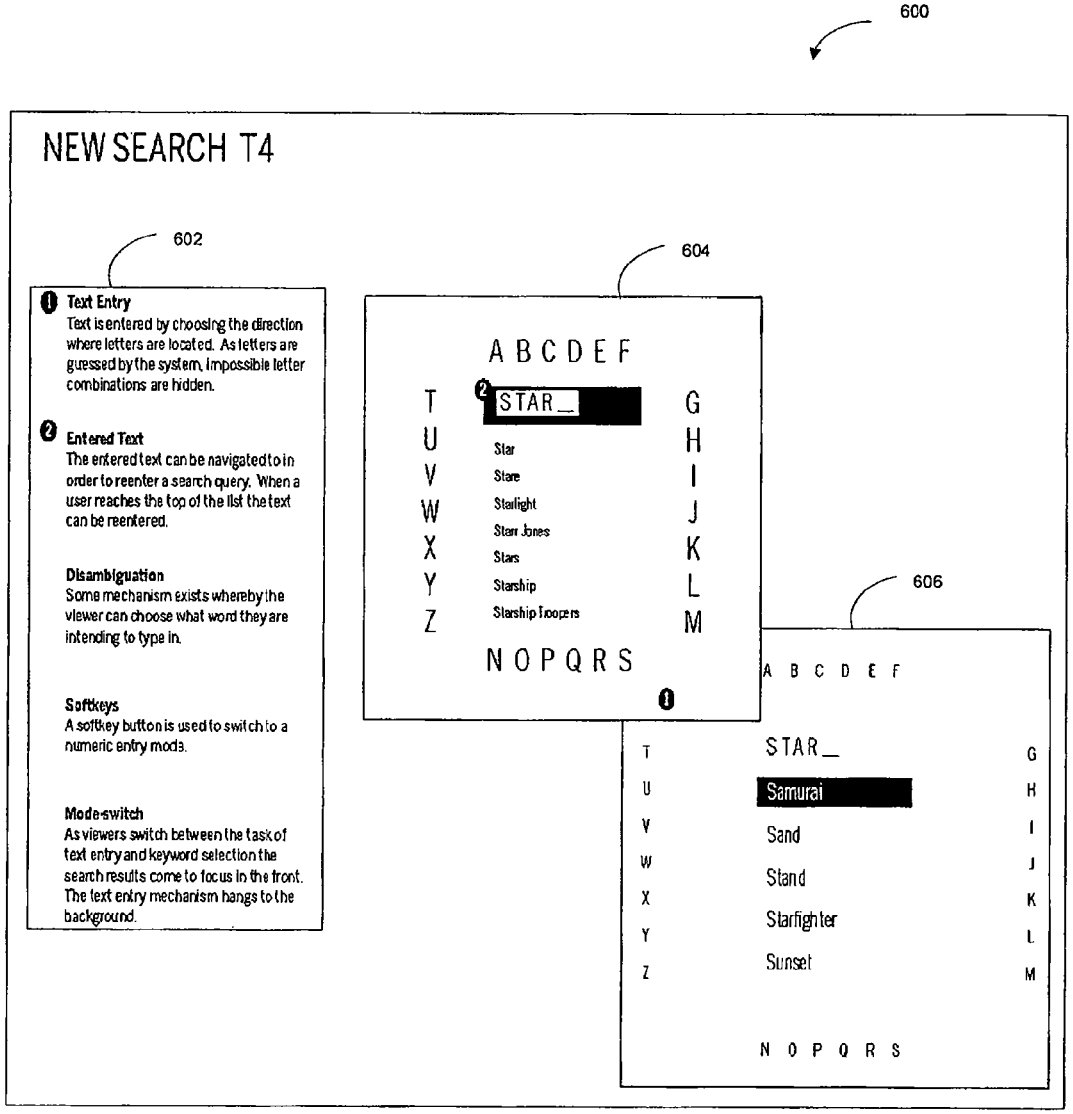
FIG. 6 illustrates a viewer interface to enter text utilizing four directional keys, in accordance with an example embodiment.

In another embodiment, instead of presenting the wheels of letters to a viewer, each of the four directional keys may be associated with a plurality of letters, so that the viewer may be able to select letters by pressing the directional keys. For example the "Up" key may be associated with the letters A, B, C, D, E and F. This technique may be termed "T4," as text may be entered via the four directional keys provided on a remote control device. Because, in this embodiment, there is no one-to-one association between letters and the directional keys, the text entry module 208 of FIG. 2 may be configured to guess/deduce which letter from the letters associated with the directional key is selected by the viewer after two or more requests to select a character have been entered by the viewer. For example, when the text entry mode is active and a viewer presses an "Up" key and then a "Down" key, the system may display "A" as the selected letter. The text entry module 208 may be configured to permit the viewer to indicate that the guess is incorrect and, in response, provide the next guess (e.g., "E") until the viewer is satisfied with the guess. In one example embodiment, the text entry module 208 is configured to present potentially acceptable characters to the viewer by guessing the characters after the viewer have entered at least two possible characters. For any subsequent letter selections, the text entry module 208 may cooperate with the dictionary module 212 to determine whether any letters should be hidden because the selection of those letters would result in a term that is not recognized by the dictionary module 212. If the combination of the selected letters results in a plurality of valid dictionary terms, the system may display multiple choices and invite the viewer to select the appropriate term. An example of the "T4" technique is illustrated in FIG. 6. A visualization 600 of this technique, entitled "New Search T4," describes steps 1, 2, and 3, in area 602. The resulting viewer interface that appears on the viewer's screen is illustrated in areas 604 and 606.

Returning to FIG. 4, at operation 408, the search term detector 210 determines whether the search request is associated with keyword selection. Any other means of a search request may be determined at operation 410. Keyword selection may be provided, for example, via a media card. A media card, as mentioned above, may be represented as a display area dedicated to additional information associated with a particular content item. A viewer may bring up a media card associated with the currently viewed content. A viewer may also be permitted to bring up a media card associated with a preview item. A media card, in one example embodiment, may have various actions associated with it. For example, a media card may include a "Save" action, to permit a viewer to save the associated content item for later viewing.

In one example embodiment, the example system to search viewable content may be configured to present a navigation grid associated with some or all of the margin menu to provide a more advanced discovery mode. A respective a navigation grid for a margin menu may be requested by pressing the direction button a second time when the margin menu is shown. For example, a recommendation margin menu may be associated with a recommendation grid, which is described further below. A "Recommend" action on a media card, for example, may be configured to permit a viewer to drive a recommendations grid based on the piece of content associated with the media card. An example media card is illustrated in FIG. 7.

Figure 7:
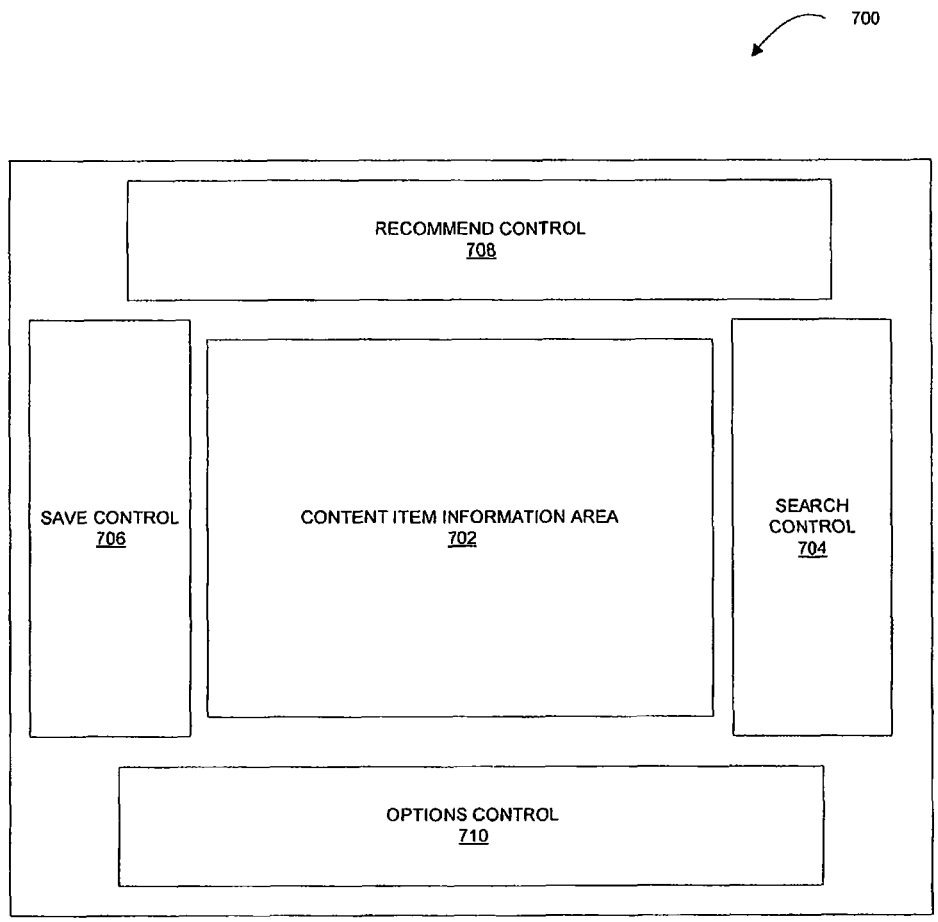
FIG. 7 illustrates a media card, in accordance with an example embodiment.

As shown in FIG. 7, a media card 700 may include an information area 702, a search control 704 to activate a search mode, a save area 706 to permit designating the content item for future viewing, a recommend control 708 to activate a recommendation mode, and an options control 710. The options control 710 may activate various additional features associated with an example media card. Other controls provided with the media card 700 may include actions such as recommending a content item to other viewers or submitting a review of content item. It will be noted that, in one example embodiment, any element of the media card may be actionable (e.g., a viewer may click on an actor's name and view further information about the actor, etc.). The actions associated with a media card may be navigated to, in one example embodiment, utilizing the directional keys on a remote control device, which may map to the same direction as the UI itself. Activation of an action may, for some actions, present a viewer with additional choices before the action is completed. For example, for the "search" action, a list of associated keywords may be presented to provide the search term. The keywords, as well as other information displayed on a media card, may be stored as metadata associated with the content item.

As mentioned above, the system 200 may be configured to receive requests initiated by activating directional keys provided on a television remote control device. The requests may activate functionality to provide shortcuts to a variety of content navigation functions (e.g., to automatically engage a particular way of navigating), and thus may be referred to as "surfcuts," as navigating through content is sometimes referred to as "surfing". A content navigation function (or a content navigation mode that may comprise a variety of navigation functions) may be associated with a particular margin menu. The search margin menu is an example margin menu.

Returning to FIG. 4, the search term detector 210, at operation 412, determines a search term associated with the request received by the communications module 202. Once the search term has been determined, the search module 204 locates one or more relevant content items based on the determined search term, at operation 414. The presentation module 206 of the system 200 presents to the viewer search results based on the located content items, at operation 416.

In one example embodiment, in response to a search request, a viewer is presented, at operation 418, with one or more terms reflecting more precise meanings of the search term determined from the search request, as a way to permit the viewer to filter or refine the search results. A process to determine a more precise meaning of the search term may be referred to as disambiguation. If it is determined, at operation 420, that the viewer selected the presented term that reflects a more precise meaning of the search term, the selected term is used to generate refined search results at operation 422. At operation 424, the refined search results are presented to the viewer. If it is determined, at operation 426, that the viewer selected a particular item from the search results, e.g., by navigating to the particular item and activating the "Select" button on the remote control device, the content item associated with the selection is displayed at operation 428.

Figure 8:
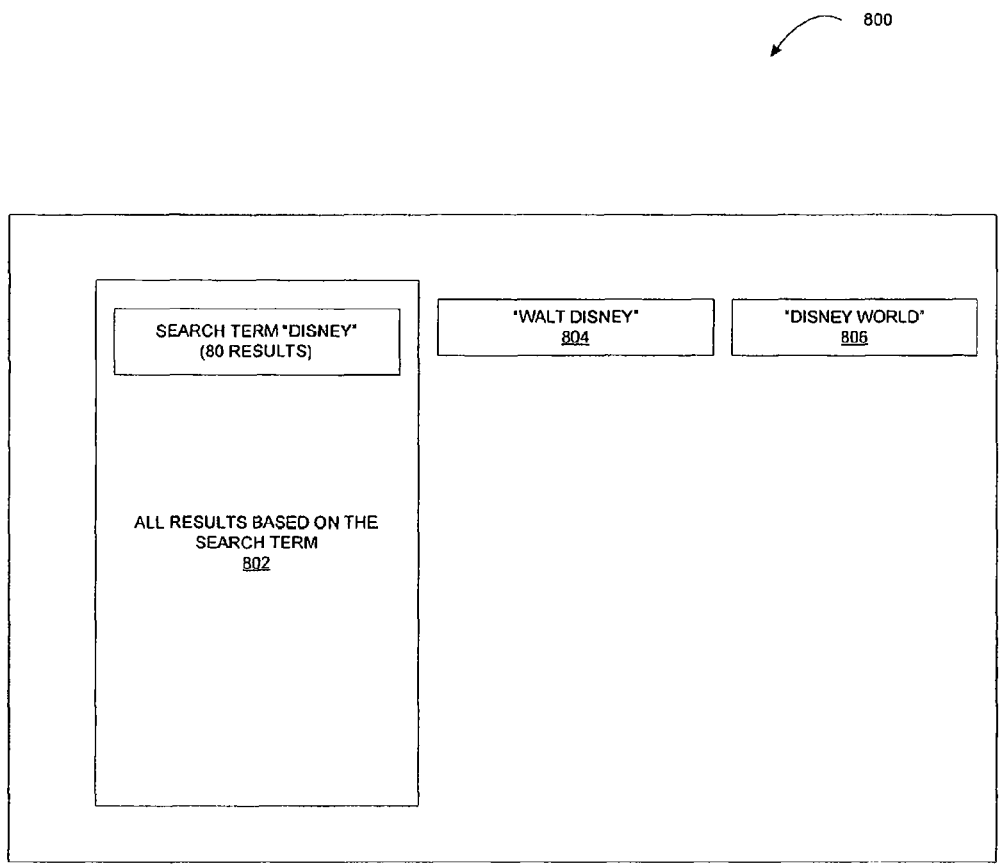
FIG. 8 illustrates a presentation interface that utilizes a disambiguation technique, in accordance with an example embodiment.

An example presentation interface that utilizes a disambiguation technique is illustrated in FIG. 8. As shown in FIG. 8, a presentation area 800 comprises a section 802 that includes a list of all content items associated with the search results located by the search module 204. The other sections of the screen may present choices of how the entire list of content items can be filtered to provide more refined search results. For example, if the search term is "Disney," the search may produce 800 results. The viewer may be permitted to look at these individual content items within the search results or use mechanisms to refine the search by choosing a disambiguated meaning of the search term, such as "Walt Disney" (presented in area 804) or "Disney World" (presented in area 806), with each results set reduced automatically as the different meanings are selected.

Figure 9:
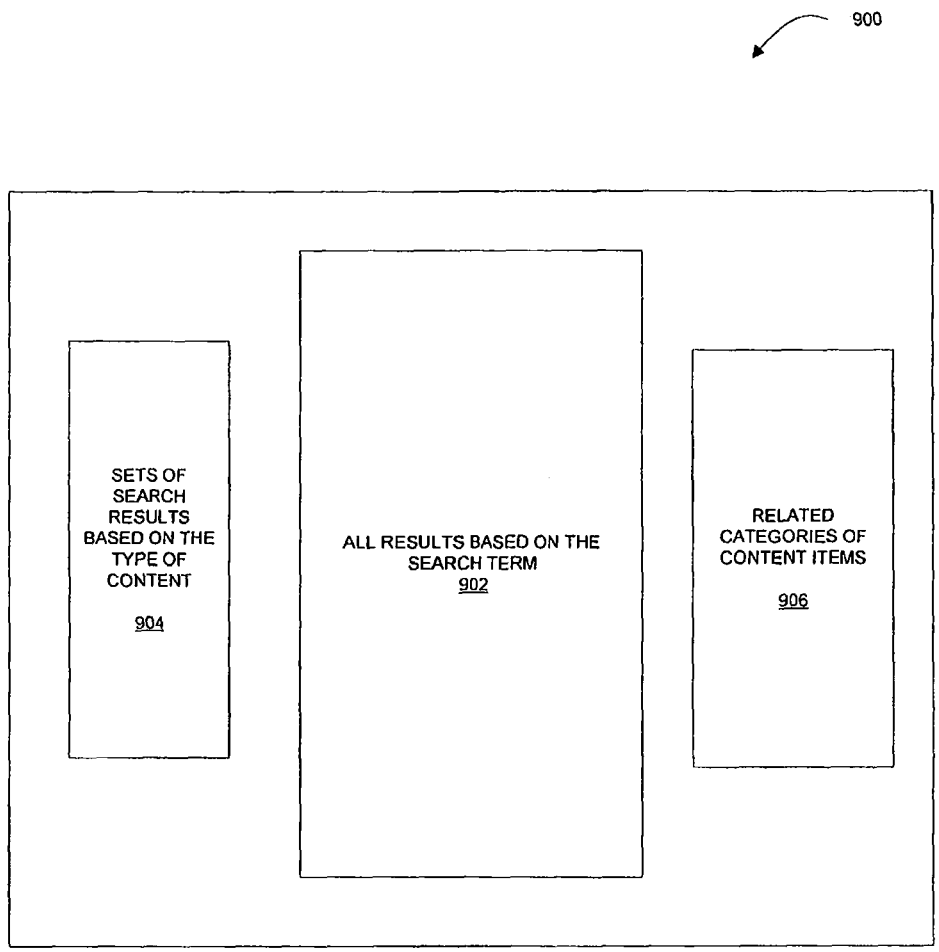
FIG. 9 illustrates a presentation interface to permit refinement of search results, in accordance with an example embodiment.

Another example mechanism to refine or filter the search results is to present the viewer with an option to select a particular keyword, tag, category, or a type of content. An example presentation interface providing a viewer with a selection of a keyword, a tag, a category, or a type of content is illustrated in FIG. 9. As shown in FIG. 9, a presentation area 900 includes a section 902 showing an entire list of search results, a section 904 showing a list of content types, and a section 906 showing a list of related categories of content items associated with the search results located by the search module 204. For example, the list of content items produced by the search based on "Disney" may be filtered further based on the type of content associated with the term "animals" (which may be listed in the area 906) or only content that are TV series (which may be listed in the area 904). The search results can be filtered multiple times, reducing the search result set with each filter by selecting different terms. A reduced set of search results can be expanded by removing selected filters. The filters can be removed in any order not necessarily the order in which they were selected One example interface is single screen faceted browsing, where a list of filter terms is presented in multiple lists in the same interface as the search result list. One list of terms may be content categories and another list of terms may be content specific keywords/tags. In one example embodiment, moving between the terms and selecting terms from the lists allows the search results to be filtered/pivoted. The viewer may navigate between the search results list and search term lists using the "Left" and "Right" directional keys and navigate up and down the lists using the "Up" and "Down" directional keys. The search results list may contain images, text, or video to identify the associated content in the search result set.

One example of a search results list is a "lightbox" model, where a search result is just the title of a content item except for the search item that has focus, which would be expanded in size to contain a thumbnail video or a still image. In one example embodiment, the pool of content utilized to generate a list of search results includes broadcast content, on-demand content, recorded content, Internet content, content stored on a local network, as well as any other type of content that may be viewable on a television set, or any other display device.

Figure 10:
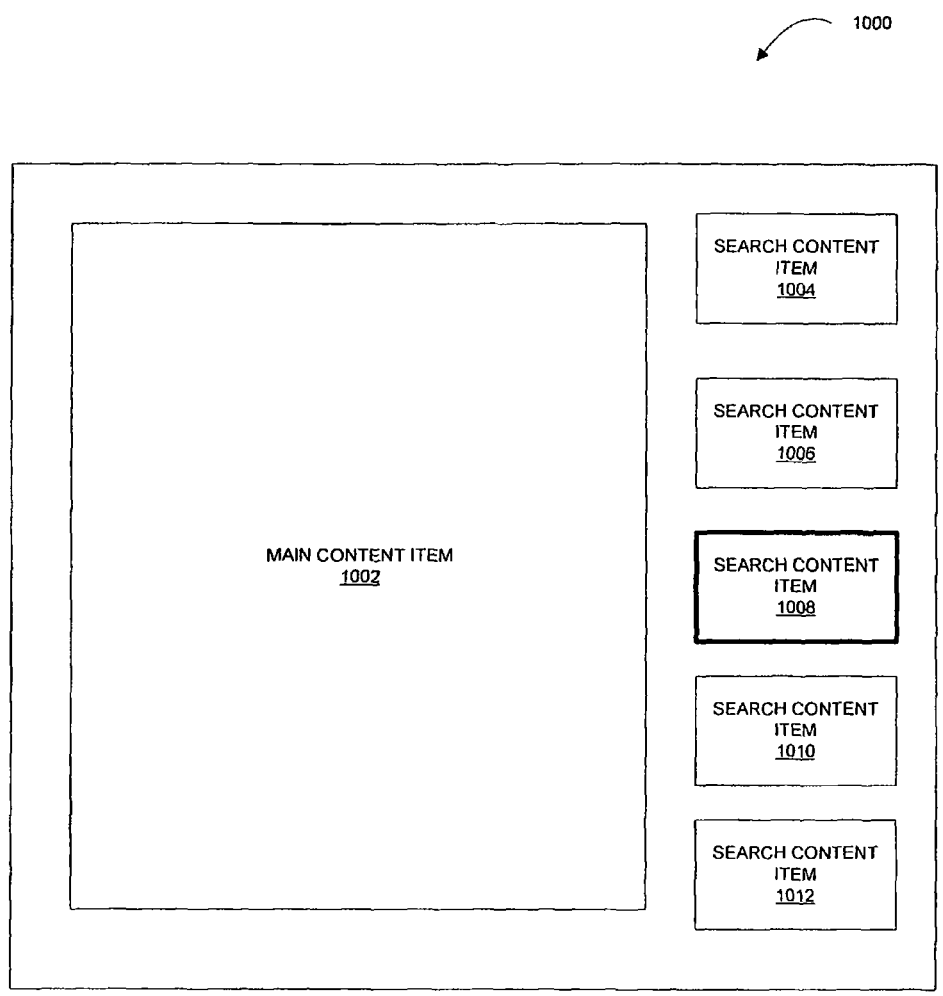
FIG. 10 illustrates a search margin menu, in accordance with an example embodiment.

In one example embodiment, a viewer may access content items associated with previously generated search results by activating a search margin menu. In one example embodiment, the search margin menu that may be presented near the right margin of the viewer's screen, displays content items associated with previous search results. The search margin menu may be activated by the "Right" directional key on a remote control device. An example search margin menu is illustrated in FIG. 10. As shown in FIG. 10, a main content item 1002 is presented to occupy the larger portion of a display area 1000. Content items 1004-1012 of the search menu are displayed along the right margin of the display area 1000. The content item 1008 is shown to have focus and in preview mode. The search grid with the current search results set may be accessed from the search menu by pressing the same directional key used to invoke the search margin menu when the menu is visible.

In one example embodiment, the system to navigate viewable content may be configured to provide other margin menus in addition to the search margin menu. Other margin menus may include a library margin menu, a broadcast margin menu, sceneographic margin menu, and a recommendation margin menu. As mentioned above, the system may be configured to present a navigation grid associated with some or all of the margin menu to provide a more advanced discovery mode that may be requested by pressing the direction button a second time when the margin menu is shown.

The library margin menu, in one example embodiment, permits a viewer to access content, both for locally sourced content (e.g., PVR), and remotely sourced content (e.g., video on demand, content from a local network, content via Internet-based distribution, etc.). The library margin menu, in one example embodiment, may be activated by the "Left" directional key on a remote control device and may be displayed near the left margin of the viewer's screen. Each item in the library margin menu may have associated "Preview" and "Select" (or "OK") options. The "Preview" option may permit a viewer to visually access the content that is different from the currently viewed content, while continuing to display the currently viewed content. Once the library margin menu has been engaged, a viewer may use directional keys on a remote control device to move between different content items (e.g., by pressing the "Up" and "Down" directional keys). The "Select" key, activated on a remote control device, in one example embodiment, causes the currently viewed content to be replaced by the new content. The library margin menu, in one example embodiment may be associated with a library grid. An example library grid includes a display area divided into a plurality of sections, where each section (e.g., each column) includes library content items associated with different categories. In some embodiments a viewer may be invited to use default categories (e.g., "Movies," "TV Programs," "Sports," "Photos," etc.) or create custom categories. In one example embodiment, the content items that may be accessed utilizing the library menu and the library grid are the content items that have been designated by a viewer as being of interest to the viewer (e.g., recorded, bookmarked, etc.)

Another example of a margin menu is a broadcast margin menu. The broadcast margin menu, in one example embodiment, may be activated by the "Down" directional key on a remote control device and may be displayed at the bottom of the viewer's screen. The broadcast margin menu may permit a viewer to see what TV programs are available on other channels.

In one example embodiment, a viewer may be permitted to select and view a program from the broadcast margin menu, or, alternatively, the viewer may be permitted to access a so-called broadcast grid associated with the broadcast margin menu. In one example embodiment, the broadcast grid is an additional linear TV grid, which may include some features of a conventional TV grid. In one example embodiment, the TV grid may be displayed such that the channels run across the top of the viewer's screen, while the time runs down the side of the viewer's screen. It will however be appreciated that the grid could be provided on any display device. The broadcast grid may be accessed by the viewer by pressing the same button that was used to access the broadcast margin menu while the broadcast margin menu is visible.

Within the broadcast grid, a viewer may be permitted to not only navigate by content, but also by the channel names or brands. So as with any other content item, a viewer may bring up a media card to view information associated with a particular channel, to search based on that channel, to make recommendations based on the channel brand, or to save content associated with the channel.

In one example embodiment, each content item associated with a particular channel in the broadcast margin menu (or in a broadcast grid) may be displayed utilizing a still image or streaming video. When the channels in the broadcast margin menu or in a broadcast grid are represented as streaming videos, a viewer may be permitted to actually sample the channels' content directly through these individual screens. In one example embodiment of the broadcast grid, the text associated with different TV programs may be presented as having different color, brightness, or different font size, or any combination of the above, to indicate a recommendation generated by the anticipation engine 230 of the system 200 illustrated in FIG. 2. Thus, while a viewer is presented with information associated with several different channels, the viewer may be capable of quickly identifying a TV program that is of most interest to her.

In one example embodiment, the "Up" directional key on a remote control device may be utilized to engage a recommendations margin menu. The recommendations margin menu may be associated with an engine that may be configured to intelligently anticipate a viewer's choice of particular content. Thus, such an engine may be termed an anticipation engine. The recommendations generated by an example anticipation engine may be based, for example, on the specific content that the viewer is currently watching, a profile of the viewer, environmental context, general popularity, or any combination of the preceding factors. A margin menu with several recommended content items may appear near the top margin of the viewer's screen in response to the control key. The viewer may then select any of the recommended content items, either for preview or for committed viewing. Alternatively, the viewer may choose to solicit further recommendations by engaging a so-called full committed interface (or entering a committed recommendations mode). While in the example committed recommendations mode, a viewer may request recommendations from the anticipation engine based not on the originally viewed content but rather based on the selected recommended content item. In response, the anticipation engine may provide further recommendations to be displayed by the navigation interface.

It will be noted, that the recommendations mode that permits viewers to view recommendations and solicit more targeted recommendations may be accessed from any other margin menu, navigation grid, media card, or any other component of the viewer interface. In one example embodiment, a viewer may be presented simultaneously with recommendations based on the originally viewed content and with recommendations based on the selected recommended content item, as well as on the profile of the viewer. The content item that is selected to be the basis for a group of recommended content items may be called a source item. For example, while the system is operating in the committed recommendations mode, a source item (e.g., a source video) may be displayed along with two recommended content items displayed either side of it. A viewer may be permitted to navigate with the "Left" and "Right" directional keys to either of those content items. If a viewer navigates to a recommended content item and selects it, the item may be then brought into focus and displayed in the center of the viewer's screen, as the new source content item, surrounded by two other recommendations. A viewer may navigate with the "Up" directional keys to retain the current source content and replace the two recommended content items with two new recommendations based on the same source item. A viewer may navigate with the "Down" directional keys to return to a previous source item. The recommendations may be displayed as still images, while the source item may be displayed as a streaming video. Data about the recommendations and the source item may be displayed with images, video, or text, for example, title. For a recommendation item, this data may also include the tag/keyword common to the recommendation item and source item that had the most influence on the recommendation being made.

To illustrate an example use case of the recommendations mode, as a viewer follows the direction of a recommendation, the new recommendation in the same direction may have the same link, creating an association between the direction and the tag/keyword while the same direction is followed. In one example embodiment, the recommended content items may be selected from a variety of sources, such as broadcast television, video-on-demand, the content on the viewer's PVR, the content available over the Internet, content available from a local network(s), as well as from any interactive, dynamic or Internet Protocol (IP) based content.

The anticipation engine, in one example embodiment, may utilize a variety of criteria in order to generate recommendations for a particular viewer. An example criteria may include the viewer's consumption statistics or viewing behavior, e.g., what a viewer has actually watched in the past. Another criterion that may be used by the anticipation engine is a viewer's environment, e.g., the current time of day, the viewer's geographic location, or the type of the viewer's display device (e.g., a TV set which may be a standard definition TV set or a high definition TV set). Furthermore, the anticipation engine may utilize data that may be indicative of the viewer's mood. For example, information pertaining to how hard the viewer is pressing the remote control buttons and how long the viewer has lingered on each content item may provide an indication of the viewer's mood. Thus, the anticipation engine may be configured to utilize a viewer's environment and mood indicators, in addition to utilizing the viewer's consumption patterns, in order to generate recommendations. It will be noted that, in one example embodiment, the anticipation engine may utilize a variety of recommendation techniques. For example, the content presented to a viewer as related to the source content item may be shared from a social network, and use collaborative filtering.

In one example embodiment, a viewer may be presented with reasoning behind recommendation, e.g., the name of the actor, a category, a particular key word, etc. The recommendations may be based, for example, on one or more characteristics of the source content item, on the viewer's personal profile, or on a combination of both.

Figure 11:
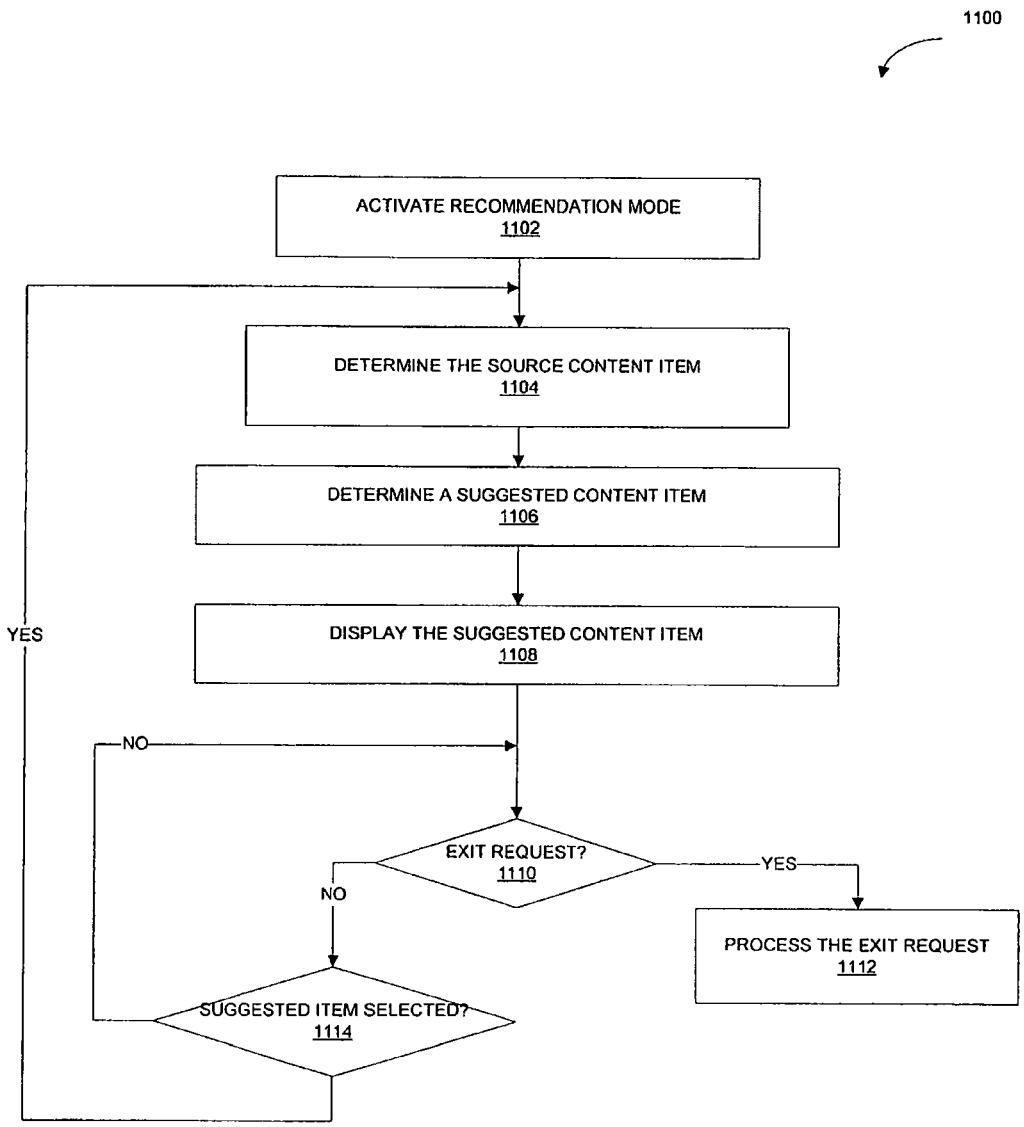
FIG. 11 is a flow chart illustrating a method, in accordance with an example embodiment, to provide recommendations from the content items available for viewing.

FIG. 11 illustrates is an example method 1100 to provide recommendations. The method 1100 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2.

As shown in FIG. 11, the method 1100 commences with operation 1102, where the communications module 202 of the system 200 receives a request to activate the recommendation mode. The recommendation mode may be activated by a viewer is a variety of ways. For example, as mentioned above, a viewer may activate the recommendation menu. The recommendation mode may also be activated by selecting a "Recommend" control presented on a media card. At operation 1104, the anticipation engine 230 determines the source content item and then determines one or more recommended content items, at operation 1106 based, e.g., on metadata associated with the source content item and the viewer's profile.

The suggested content items are displayed at operation 1108. The method 1100 proceeds further to permit a viewer to explore further recommendation, unless it is determined, at operation 1110, that the viewer requested to exit the recommendation mode, in which case the system 200 processes the exit request, at operation 1112. In one example embodiment, if it is determined, at operation 1114, that the viewer selected a suggested content item, the method proceeds to operation 1104 to display the selected content item as a new source item and continue with determining further suggested content.

In some embodiments, the anticipation engine 230 may be configured to generate a set of recommendations first, and then, for each recommendation, compare keywords from a recommended content item metadata with keywords from the source content item metadata to determine a keyword that reflects such commonality between these to content items that the keyword may be considered the strongest link between the recommended content item and the source content item. This determined keyword may be used by the anticipation engine 230 to drive further recommendations in response to further navigation requests from the viewer.

It will be noted that, although the embodiments have been described by way of example with reference to digital video, it will be appreciated to a person of skill in the art that the techniques described herein may be utilized to navigate and to manage the choice of any digital data.

Figure 12:
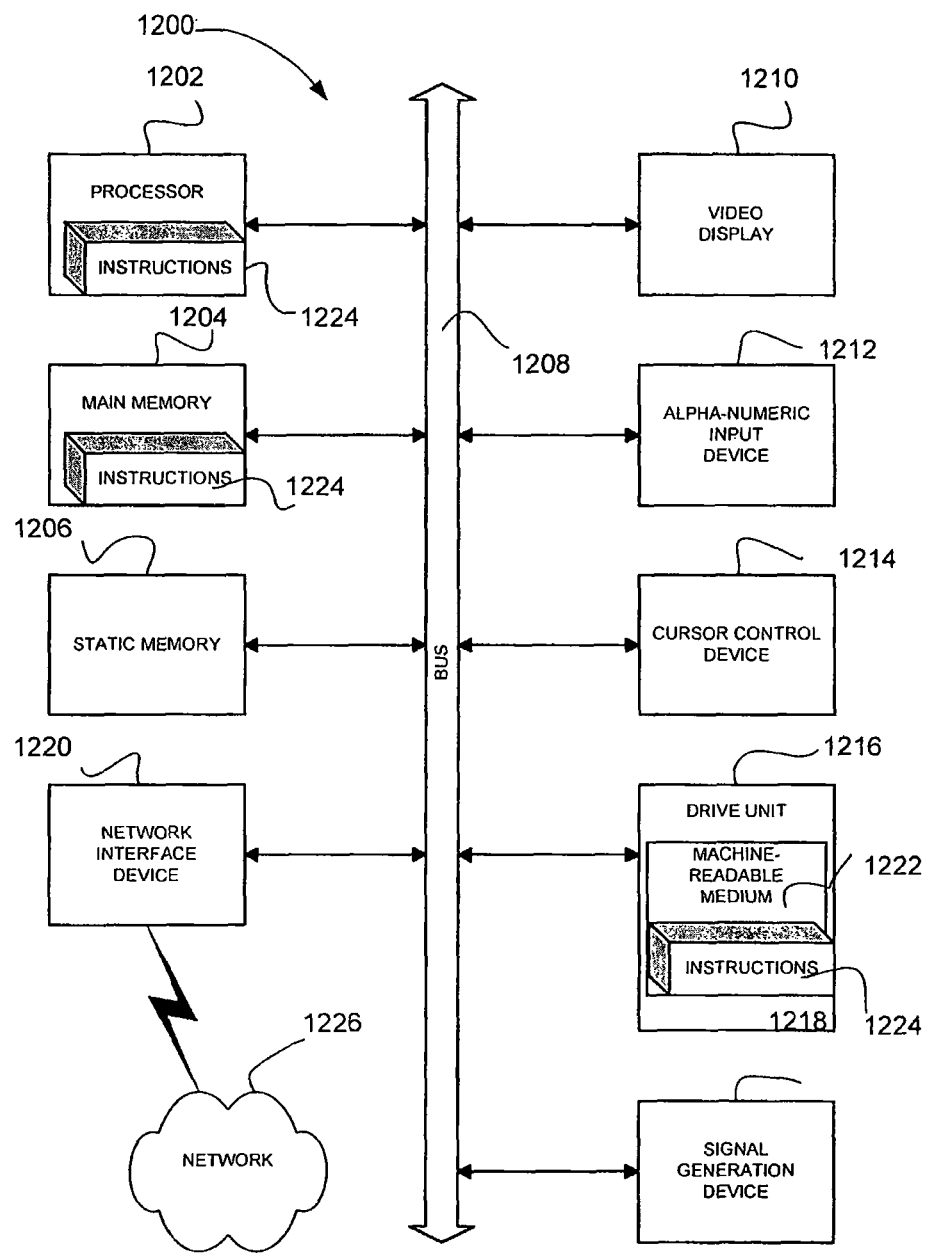
FIG. 12 illustrates a diagrammatic representation of a machine in the example form of a computer system within which a set of instructions, for causing the machine to perform any one or more of the methodologies discussed herein, may be executed.

FIG. 12 shows a diagrammatic representation of machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a real or virtual keyboard), a viewer interface (UT) navigation device 1214 (e.g., a remote control or a mouse), a disk drive unit 1216, a signal generation device 1218 (e.g., a speaker) and a network interface device 1220.

The disk drive unit 1216 includes a machine-readable medium 1222 on which is stored one or more sets of instructions and data structures (e.g., software 1224) embodying or utilized by any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media.

The software 1224 may further be transmitted or received over a network 1226 via the network interface device 1220 utilizing any one of a number of well-known transfer protocols (e.g., HTTP).

While the machine-readable medium 1222 is shown in an example embodiment to be a single medium, the term "machine-readable medium" may be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising:
a processor; and
a presentation module that configures the processor to:
simultaneously display a plurality of characters in a first display area of a graphical user interface, the graphical user interface including a second display area to display at least a portion of a search term, the second display area intersecting the first display area in a selection area;
position, based on an input from a user, a character of the plurality of characters in the selection area;
select and simultaneously display, based on the positioned character, a further plurality of characters in a third display area that intersects the second display area, the further plurality of characters being selected based on an analysis of a frequency with which the character positioned in the selection area occurs within terms stored in a dictionary module, a further character among the further plurality of characters being included in the portion of the search term; and
in response to a selection of the character by the user, indicate the character as included in at least the portion of the search term within the second display area.

2. The system of claim 1, wherein the presentation module configures the processor to display each of the further plurality of characters as a predicted character available for following the positioned character within the search term.

3. The system of claim 1, wherein:
the first display area and the second display area are elongate display areas that are orthogonal to each other in the graphical user interface.

4. The system of claim 1, wherein:
the plurality of characters has a start character and an end character; and
the positioning of the character in the selection area includes replacing the end character in the selection area with the start character.

5. The system of claim 1, wherein:
the selection of the positioned character is made from a wheel of characters; and
the displaying of the plurality of characters displays a portion of the wheel of characters.

6. The system of claim 1, wherein:
the positioning of the character in the selection area includes moving the character from outside the selection area into the selection area.

7. The system of claim 1, wherein:
the indicating of the positioned character as included in at least the portion of the search term includes rendering the positioned character in a font size exclusive to the second display area within the graphical user interface;
the presentation module is to display the content item on a television screen; and the system further comprises:
a communications module configured to receive the request from the remote control device.

8. The system of claim 1, wherein: the input from the user includes a text entry request initiated using one or more directional keys of a remote control device; and the system further comprises:
a communication module configured to receive input from the user.

9. The system of claim 1, wherein:
the selection of the positioned character includes a character selection request initiated using one or more directional keys of a remote control device; and the system further comprises:

a communication module configured to receive the selection of the character.

10. The system of claim 1, further comprising:
a search module configured to identify a content item based on the search term; and wherein:
the presentation module configures the processor to present a search result that corresponds to the content item.

11. The system of claim 1, wherein:
the plurality of characters has a sequential order; and
the displaying of the plurality of characters includes displaying a first character as precedent to a second character according to the sequential order.

12. A method comprising:
simultaneously displaying a plurality of characters in a first display area of the graphical user interface, the graphical user interface including a second display area to display at least a portion of the search term, the second display area intersecting the first display area in a selection area;
positioning, based on an input from a user, a character of the plurality of characters in the selection area;
selecting and simultaneously displaying, based on the positioned character, a further plurality of characters in a third display area that intersects the second display area, the further plurality of characters being selected based on an analysis of a frequency with which the character positioned in the selection area occurs within terms stored in a dictionary module, a further character among the further plurality of characters being included in the portion of the search term, the selecting and displaying being performed by a processor of a machine; and
in response to a selection of the positioned character by the user, indicating the positioned character as included in at least the portion of the search term within the second display area.

13. A non-transitory machine-readable medium comprising instructions that, when executed by one or more processors of a machine, cause the machine to perform operations comprising:
simultaneously displaying a plurality of characters in a first display area of the graphical user interface, the graphical user interface including a second display area to display at least a portion of the search term, the second display area intersecting the first display area in a selection area;
positioning, based on an input from a user, a character of the plurality of characters in the selection area;
selecting and simultaneously displaying, based on the positioned character, a further plurality of characters in a third display area that intersects the second display area, the further plurality of characters being selected based on an analysis of a frequency with which the character positioned in the selection area occurs within terms stored in a dictionary module, a further character among the further plurality of characters being included in the portion of the search term, the selecting and displaying being performed by a processor of a machine; and
in response to a selection of the positioned character by the user, indicating the positioned character as included in at least the portion of the search term within the second display area.

* * * * *

UNITED STATES PATENT AND TRADEMARK OFFICE
CERTIFICATE OF CORRECTION

PATENT NO. : 8,429,692 B2
APPLICATION NO. : 12/377653
DATED : April 23, 2013
INVENTOR(S) : Zeldis et al.

It is certified that error appears in the above-identified patent and that said Letters Patent is hereby corrected as shown below:

On Title page, in column 2, under (57) Abstract, line 1, After "system", delete "to search", therefor On Title page 2, in column 2, under "Other Publications", line 4, delete "Mailed" and insert --mailed--, therefor On Title page 2, in column 2, under "Other Publications", line 6, delete "Filed" and insert --filed--, therefor On Title page 2, in column 2, under "Other Publications", line 7, delete "No.," and insert --No. 2007292910--, therefor On Title page 2, in column 2, under "Other Publications", line 10, delete "Filed" and insert --filed--, therefor On Title page 2, in column 2, under "Other Publications", line 22, delete "mailed" and insert --filed--, therefor On Title page 2, in column 2, under "Other Publications", line 24, after "Response", insert --filed--, therefor In the Claims:

In column 14, line 57, in claim 8, after "wherein:", insert --¶--, therefor

Signed and Sealed this
Twenty-fourth Day of September, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,429,692 B2  Page 1 of 1
APPLICATION NO. : 12/377653
DATED : April 23, 2013
INVENTOR(S) : Zeldis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this
Eighth Day of September, 2015

Michelle K. Lee
*Director of the United States Patent and Trademark Office*